Sept. 12, 1950     H. H. AMTMANN     2,521,680
PRONE POSITION AIRCRAFT CONTROL SYSTEM
Filed March 10, 1949     2 Sheets-Sheet 1
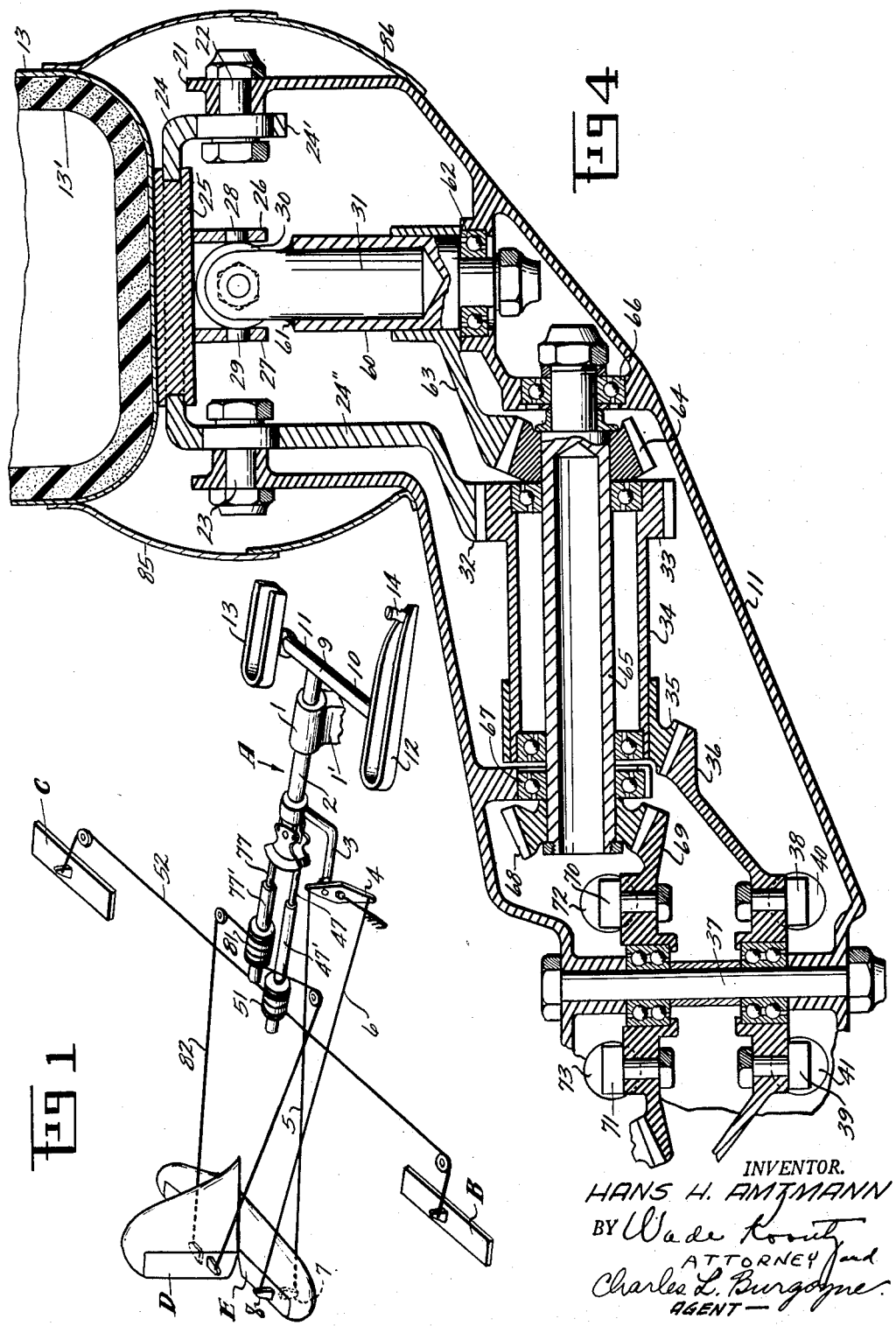
INVENTOR.
HANS H. AMTMANN
BY
ATTORNEY
AGENT Sept. 12, 1950          H. H. AMTMANN          2,521,680
PRONE POSITION AIRCRAFT CONTROL SYSTEM
Filed March 10, 1949          2 Sheets-Sheet 2
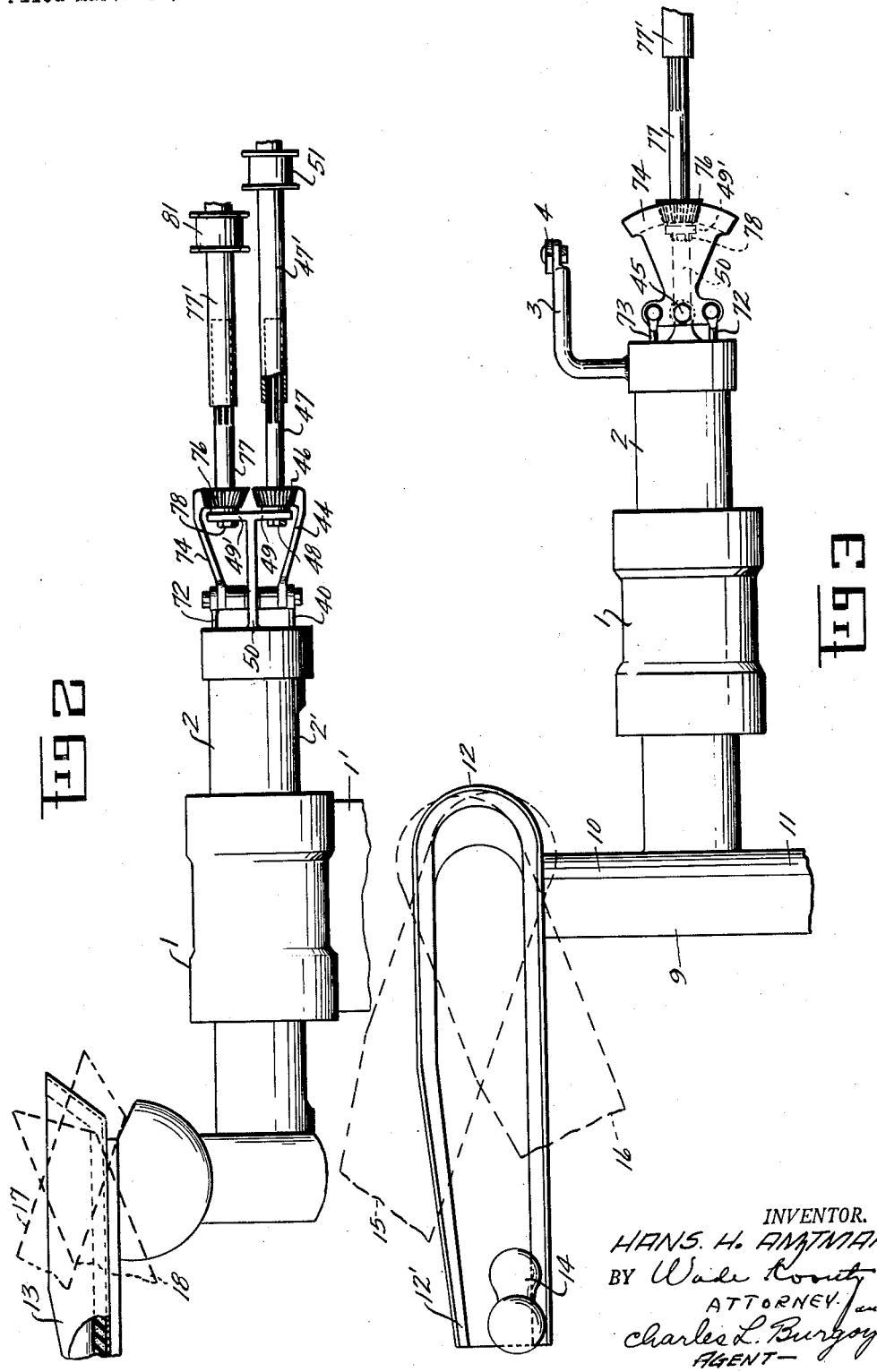
INVENTOR.
HANS. H. AMTMANN
BY
ATTORNEY and
Charles L. Burgoyne,
AGENT Patented Sept. 12, 1950

2,521,680

UNITED STATES PATENT OFFICE 2,521,680

PRONE POSITION AIRCRAFT CONTROL SYSTEM

Hans H. Amtmann, Hamburg, Germany

Application March 10, 1949, Serial No. 80,701

7 Claims. (Cl. 244—83)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to a system of aircraft control particularly adapted for use in prone position manipulation by an aircraft pilot.

The primary object of the invention is to provide a system of three dimensional aircraft control particularly adapted for manipulation by a pilot located in the aircraft in a prone position extending fore-and-aft of the aircraft.

A further object of the invention is to provide a system of three dimensional aircraft control in which a pilot reposing in a face-down prone position has easy access to one or a pair of movably mounted arm rests, the manipulation of which will effect three dimensional aircraft control.

Another object of the invention is to provide a coordinated system of three dimensional aircraft control in which movably mounted arm rests conveniently located for receiving the pilot's forearms may be manipulated in a particular way to exercise complete control over the directional, attitude and bank characteristics of the aircraft flight.

Another object of the invention is to provide a coordinated system of three dimensional aircraft control in which conveniently positioned arm rests may be shifted in fore-and-aft translation to effect elevator control, may be tilted about transverse axes to effect aileron control and may be turned about vertical axes to effect rudder control.

Another related object of the invention is to provide a novel arm rest actuated aircraft control system which will permit an unobstructed forward vision not only of the instrument panel but of the terrain as well.

Another object of the invention is to provide a novel system of aircraft control in which all aircraft control by movement of arm engaging elements and in which only a single such element may effect control when necessary.

The above and other objects of the invention will become apparent upon reading the following detailed description of the invention in conjunction with the accompanying drawings, in which:

Fig. 1 is a schematic view in perspective to show the general arrangement of the control system with respect to the usual aircraft control surfaces or members.

Fig. 2 is an elevation view of the control mechanism for installation in the aircraft cabin.

Fig. 3 is a plan view of the control mechanism for installation in the aircraft cabin.

Fig. 4 is a partial cross section of the control mechanism adjacent to the arm rests.

In modern high-speed aircraft the pilot is confronted with more hazards than formerly because of higher speeds, greater acceleration forces and restricted cabin space. Also the usual control column being directly in front of the pilot, his view of the instrument panel is thereby restricted. In order to overcome these hazards at least partly the present invention employs a system of control which is different from the more conventional control column type or stick type which further requires a rudder bar or foot controlled steering means in addition to the control column. The present system is adapted for manipulation by a pilot supported in a prone position, which position provides improved blood circulation as high acceleration forces come into play as for instance in coming out of a dive or numerous other maneuvers possible in an aircraft. The chances of a pilot blackout during high speed flight will thus be very materially reduced by the prone position control system. The prone position favors blood circulation generally, and particularly favors an adequate supply of blood to the head in contrast to the blood supply thereto in the usual sitting position. Thus on dive pull-outs the pilot may take more than twice the usual acceleration force without danger of losing consciousness. Also the reduction of frontal area in high speed aircraft has reduced fuselage diameter and head room, with the result that the prone position for the pilot presents further advantages.

Considering now a preferred arrangement of prone position control system reference is first made to Fig. 1. The system is there shown apart from a complete aircraft but the spatial orientation of the system is like that found in a complete aircraft. Thus the cockpit or cabin will contain the control mechanism A and the wings will have the ailerons B and C hingedly mounted thereon at the outer trailing edges to control the aircraft about the bank or roll axis. The rudder D will be hingedly mounted on the vertical stabilizer to control the aircraft about the yaw axis and the elevator E will be hingedly mounted on the horizontal stabilizer to control the aircraft about the pitch axis. The control members B, C, D and E carry the usual horns or rigid projections to which the control cables are attached, as will be apparent from the drawing.

The control mechanism A comprises a stationary sleeve or slide box 1 mounted on the cabin floor by means of an integral stand or extension 1'. The slide box or bearing 1 contains antifriction bearings of any preferred type to slidably mount the control column or crosshead 2 for movement in a direction generally fore-and-aft of the aircraft. To prevent relative rotation of the column and box, the column is provided with a flat side 2' engaged by roller or needle bearings within the box or guide 1 (see Fig. 2). The slidable column or crosshead 2 is in a mid-position of travel as illustrated in Figs. 2 and 3. At the aft end of column 2 there is a rigidly connected arm 3 which is pivotally connected at its free end to a lever 4. The lever 4 is pivoted at its midpoint to a part of the aircraft and the opposite ends of the lever are connected to a pair of elevator actuating cables 5 and 6. The upper and lower cables 5 and 6 are made secure at their other ends to the actuating horns 7 and 8 on elevator member E. Thus it may be seen that reciprocating motion of column 2 will rock lever 4 and through cables 5 and 6 effect up or down movement of elevator surface E. This will in turn effect control of the aircraft about the pitch axis, that is the attitude of the fore-and-aft axis with respect to horizontal.

At its forward end the column 2 is provided with a rigid control head 9 including two oppositely directed branches or arms 10 and 11 of similar construction. These branches are rigidly connected to each other and to the column 2 and at their extremities include universally pivoted arm rests 12 and 13. As seen in Fig. 4 the branches or arms 10 and 11 are hollow sections which contain mechanism to effect aileron and rudder control upon actuation of the arm rests 12 and 13 in a particular manner to be described. The arm rests, which receive the forearm only with the elbows resting in the deep rearward ends of the rests, are in the form of elongated sheet metal pans lined with sponge rubber layers 12' and 13'. From the deeper rear end the pans taper to the forward ends where the side walls are of negligible height and where there are secured hand grips 14 to enable the pilot to exert more certain control over the arm rests. Each of the arm rests may be rotated about a vertical axis at the rear end to assume positions as indicated at 15 and 16 in Fig. 3, this motion effecting rudder action. Each of the arm rests may also be rotated about a horizontal or transverse axis at the rear end to assume positions as indicated at 17 and 18 in Fig. 2, this motion effecting aileron action.

Since both of the arm rests are of similar construction a complete description of the operating mechanism for one arm rest will suffice to describe both. Reference is therefore made to Fig. 4 wherein the hollow arm 11 has an open upper end 21 carrying opposite pivots 22 and 23 in a generally horizontal position, and serving to pivotally support a bracket 24 including a short depending portion 24' and a long depending portion 24''. The upper surface of the bracket 24 is provided with a large circular aperture to rotatably receive a flanged disk 25 welded or secured to the under side of the metal pan forming arm rest 13. The disk 25 carries rigid arms 26 and 27 to receive the trunnions 28 and 29 of a swivel member 30. Other trunnions at a right angle to 28 and 29 are rotatably mounted in the upper end portions of a post 31 located with its central axis intersecting the center of disk 25. Thus the disk 25 and the post 31 may rotate together as the arm rest 13 is turned in the manner illustrated in Fig. 3. Also the trunnions 28 and 29 being coaxial with respect to pivots 22 and 23, the arm rest 13 may be tilted about this axis in the manner illustrated in Fig. 2 to thus rock the bracket 24 which includes the depending arm 24''.

The depending arm 24'', which forms part of the aileron actuating mechanism, includes an integral bevel gear portion 32 which meshes with a pinion 33 forming part of hollow shaft 34. At the inner end of this shaft there is provided a bevel gear member 35 meshing with a large diameter bevel gear member 36 journaled on a central shaft 37. On its lower face the member 36 carries actuating abutments 38 and 39 placed equal distances from shaft 37. The abutments 38 and 39 are in continuous contact with push rods 40 and 41 extending rearwardly within the column 2 to actuate the aileron-connected devices at the rear end of the sliding column. The rods 40 and 41 are of solid circular section except for the forwardly projecting ends which are cut away on top to extend under a rear edge portion of the bevel gear member 36 for contact with the abutments 38 and 39. The two slide rods 40 and 41 are mounted to slide freely within the column 2 and at their rear ends are connected to the bevel gear sector 44 pivoted to rock about the shaft or pintle 45. The gear sector 44 has driving engagement with the bevel pinion 46 fixed on a drive shaft 47, the latter being rotatably supported by means of a pivot 48 on one arm 49 of an extension 50 on the column 2. The shaft 47 has a splined fit in a tubular shaft 47', while the latter carries a rigid cable drum 51. As seen in Fig. 1 the drum 51 has an aileron actuation cable 52 trained therearound and secured to the drum at one point to prevent slippage. The shaft or pintle 45 for mounting the gear sector 44 is mounted in the extension 50 of column 2. Thus it will be seen that rocking the arm rests 12 and 13 in opposite directions about the transverse axes will result in aileron action, that is the aileron on the one side will go down and that on the other side will simultaneously go up. This will cause the wing on the one side to be forced up and the wing on the other side to be forced down and the aircraft as a whole will tilt about the roll or fore-and-aft axis. It is preferred to hook up the controls so that the wing which tips down will be on the same side of the pilot as the arm rest which is down below the normal level position, and the wing which tips up will be on the same side of the pilot as the arm rest which is up.

For rudder action the arm rests are rotated about a normally vertical axis through the post 31 but it should be understood that this will not be true vertical in a normally banked turn. However with respect to the whole aircraft it may still be considered as a vertical axis. The post 31 is seated in a cup or pivot member 60 and is secured therein as by welding at 61. The member 60, journaled in bearing 62 secured in a portion of the hollow arm 11, has secured thereto a bevel gear segment 63 which meshes with a small bevel pinion gear 64. The gear 64 is rigidly secured on a hollow shaft 65 mounted at its opposite ends in bearings 66 and 67. On the inner end of shaft 65 there is fixed a bevel pinion gear 68 meshing with a large diameter bevel gear member 69 journaled on the vertical pivot shaft 37. The member 69 carries abutment elements 70 and 71 which actuate the push rods 72 and 73 respectively, upon turning movement of the gear 69.

The pair of slide rods or push rods 72 and 73 extend longitudinally through the column 2 to the aft end thereof where they are connected to the bevel gear segment 74 mounted for rotation on shaft or pivot 45. The segment 74 meshes with the bevel pinion gear 76 mounted for rotation on the upper part 49' of bracket or extension 50. The pinion 76 is rigidly mounted on a shaft 77 having a splined fit in the hollow shaft 77'. The shaft 77 is mounted for rotation on the part 49' by means of a pivot 78. Rigidly mounted on hollow shaft 77' is a cable drum 81 around which is wrapped the rudder actuating cable 82, with the cable leading off the drum in opposite directions from the top thereof. Thus by the arrangement shown the rotation of the arm rests to the right and left will effect directional change of the aircraft to the right and left respectively. Thus in Fig. 3 if the arm rest 12 is turned to position 15 the aircraft rudder will respond to turn the aircraft to the right, or if the arm rest 12 is turned to position 16 the aircraft rudder will respond to turn the aircraft to the left. It is further emphasized that in view of the geared drives between the arm rests and the central bevel gears 36 and 69, only one arm rest needs to be manipulated to give the proper operating results. Therefore for short periods of time the pilot may effect complete control of the aircraft with only one-arm control. In order to provide a neat joint between the arm rests and the hollow arms or branches 10 and 11, a two-part cover structure 85, 86 may be provided (see Fig. 4) with the cover sections 85 and 86 secured to the arm rest and to the hollow arm respectively.

As previously explained the present aircraft control system is especially adapted for use in a prone position of the pilot. In order to make this possible there should be provided a bed-like support over the actuating mechanism A, so that the pilot may lie face downward with his forearms depending from the front end of the bed and resting in the arm rests 12 and 13. A special head rest may be provided also to take the strain off the neck and shoulder muscles. It is further noted that the arm rests may carry various switches and control levers at the front end adjacent to the hand grips, as at 14, to provide convenient control over the throttle, trim tabs and aircraft armament. Operation of wheel brakes by foot pedals rearwardly of the bed support is also feasible but does not form part of the present invention.

The operation of the elevator member E by simultaneous sliding movement or translation of the arm rests 12 and 13 in no way interferes with the operation of the rudder and aileron control shafts 47 and 77 since the splined connections of these shafts with the shaft extensions 47' and 77' allows free sliding movement at all times. The shaft extensions 47' and 77' are independently mounted for rotation on fixed bearings (not shown). It is noted that the elevator control cables 5 and 6 are so arranged as to result in climb of the aircraft when the arm rests and the control column are moved rearwardly and conversely to result in dive of the aircraft when the arm rests and the control column are moved forwardly. This preferred manner of operation is more natural and results in a minimum of fatigue for the pilot using the present control system.

The embodiments of the invention herein shown and described are to be regarded as illustrative only and it is to be understood that the invention is susceptible to variations, modifications and changes within the scope of the appended claims.

I claim:

1. In an aircraft having an elevator, rudder and ailerons for effecting aircraft control about pitch, yaw and roll axes, a control system comprising, a pair of arm rests, means pivotally mounting said arm rests in transversely spaced relation in said aircraft for simultaneous rotation about horizontal transverse axes and about vertical axes, means mounting said arm rests for slidable movement in a direction fore-and-aft of said aircraft, means for operating said elevator in response to fore-and-aft movement of said arm rests, means for operating said rudder in response to rotation of said arm rests and about said vertical axes, and means for operating said ailerons in response to rotation of said arm rests about said transverse axes.

2. In an aircraft having an elevator, rudder and ailerons for effecting aircraft control about pitch, yaw and roll axes, a control system comprising, a column slidably mounted for movement on a fore-and-aft axis of said aircraft and connected to elevator actuating means, a control head at the forward end of said column, a pair of arm rests, means pivotally mounting said arm rests in transversely spaced relation on said control head for simultaneous rotation about horizontal transverse axes and about vertical axes, means operable by said arm rests upon movement thereof about said vertical axes to operate said rudder, and means operable by said arm rests upon movement thereof about said transverse axes to operate said ailerons.

3. In a prone position aircraft control system, a longitudinally slidable control column over which the aircraft pilot is normally positioned with the column and pilot both extending in a fore-and-aft direction, means on the aft end of said column connected to elevator actuating means, a control head at the forward end of said column, a pair of arm rests, means pivotally mounting said arm rests in transversely spaced relation on said control head for simultaneous rotation about horizontal transverse axes and about vertical axes, means operable by said arm rests upon movement thereof about said vertical axes to operate a rudder, and means operable by said arm rests upon movement thereof about said transverse axes to operate ailerons.

4. In an aircraft having an elevator, rudder and ailerons for effecting aircraft control about the pitch, yaw and roll axes, a control system comprising, a column slidably mounted for movement on a fore-and-aft axis of said aircraft and connected to elevator actuating means, a control head at the forward end of said column and including two laterally and oppositely extending branches, an arm rest for each of said branches, means pivotally mounting an arm rest on each branch for simultaneous rotation about a horizontal transverse axis and about a vertical axis, means operable by said arm rests upon movement thereof about the respective vertical axes to operate said rudder, and means operable by said arm rests upon movement thereof about the respective transverse axes to operate said ailerons.

5. In an aircraft having an elevator, rudder and ailerons for effecting aircraft control about the pitch, yaw and roll axes, a control system comprising, a column slidably mounted for movement on a fore-and-aft axis of said aircraft and connected at its aft end to elevator actuating means, a control head at the forward end of said column and including two laterally extending hollow branches, a plurality of actuating rods extending through said column from said control head to the aft end of said column, means connected to said actuating rods and to rudder and aileron actuating means, an arm rest for each of said branches, means pivotally mounting an arm rest on each branch for simultaneous rotation about a horizontal transverse axis and about a vertical axis, means within said laterally extending hollow branches to energize one of said actuating rods upon movement of said arm rests about the respective vertical axes, and means within said laterally extending hollow branches to energize another of said actuating rods upon movement of said arm rests about the respective transverse axes.

6. In an aircraft having an elevator, rudder and ailerons for effecting aircraft control about the pitch, yaw and roll axes, a control system comprising, a column slidably mounted for movement on a fore-and-aft axis of said aircraft and connected at its aft end to elevator actuating means, a control head at the forward end of said column and including two laterally extending hollow branches, a plurality of actuating rods extending through said column from said control head to the aft end of said column, means actuated by said rods and mounted rearwardly of said column for connection with rudder and aileron actuating means, an arm rest for each of said branches, means pivotally mounting an arm rest on each branch for simultaneous rotation about a horizontal transverse axis and about a vertical axis, means within said laterally extending hollow branches to energize the actuating rods connected to said rudder upon movement of said arm rests about the respective vertical axes, and means within said laterally extending hollow branches to energize the actuating rods connected to said ailerons upon movement of said arm rests about the respective transverse axes.

7. In an aircraft having an elevator, rudder and ailerons for effecting aircraft control about pitch, yaw and roll axes, a control system comprising, a column slidably mounted for movement on a fore-and-aft axis of said aircraft and connected at its aft end to elevator actuating means, a control head at the forward end of said column and including two laterally and oppositely extending hollow branches, two pairs of actuating slide rods extending through said column from said control head to the aft end of said column, means actuated by one pair of rods for connection with rudder actuating means, means actuated by the other pair of rods for connection with aileron actuating means, an arm rest for each of said branches, means pivotally mounting an arm rest on each branch for simultaneous rotation about a horizontal transverse axis and about a vertical axis, means within said oppositely extending hollow branches to energize said one pair of slide rods upon movement of said arm rests about the respective vertical axes, and means within said oppositely extending hollow branches to energize said other pair of slide rods upon movement of said arm rests about the respective transverse axes.

HANS H. AMTMANN.

REFERENCES CITED

The following references are of record in the file of this patent:

UNITED STATES PATENTS

| Number | Name | Date |
|---|---|---|
| 2,411,770 | Zimmerman | Nov. 26, 1946 |

FOREIGN PATENTS

| Number | Country | Date |
|---|---|---|
| 25,726 | Great Britain | of 1909 |
| 596,881 | Great Britain | Jan. 13, 1948 |